(12) United States Patent
Chion

(10) Patent No.: US 7,953,411 B1
(45) Date of Patent: May 31, 2011

(54) VIRTUAL SOFT HAND OVER IN OFDM AND OFDMA WIRELESS COMMUNICATION NETWORK

(75) Inventor: Mary Chion, Belle Mead, NJ (US)

(73) Assignee: ZTE (USA) Inc., Iselin, NJ (US)

( * ) Notice: Subject to any disclaimer, the term of this patent is extended or adjusted under 35 U.S.C. 154(b) by 0 days.

(21) Appl. No.: 11/150,829

(22) Filed: Jun. 9, 2005

Related U.S. Application Data

(60) Provisional application No. 60/578,560, filed on Jun. 9, 2004.

(51) Int. Cl.
*H04Q 7/00* (2006.01)
*H04W 4/00* (2009.01)

(52) U.S. Cl. ........ 455/436; 455/437; 455/438; 455/439; 455/440; 455/450; 370/331; 370/332; 370/333; 370/334

(58) Field of Classification Search ............... 455/452.1, 455/436–453; 370/335, 342, 329, 308, 395.4, 370/331–334
See application file for complete search history.

(56) References Cited

U.S. PATENT DOCUMENTS

| | | | | |
|---|---|---|---|---|
| 6,002,933 A * | 12/1999 | Bender et al. | ................. | 455/442 |
| 6,307,849 B1 * | 10/2001 | Tiedemann, Jr. | ............. | 370/335 |
| 6,606,341 B1 * | 8/2003 | Kanterakis et al. | ........... | 375/130 |
| 6,771,963 B1 * | 8/2004 | Cheng et al. | ................... | 455/437 |
| 6,970,708 B1 * | 11/2005 | Raith | ............................. | 455/440 |
| 7,050,802 B2 * | 5/2006 | Dent | ............................. | 455/434 |
| 2001/0033600 A1 * | 10/2001 | Yang et al. | ..................... | 375/130 |
| 2002/0107020 A1 * | 8/2002 | Lee | ................. | 455/436 |
| 2002/0137516 A1 * | 9/2002 | Hong et al. | ................... | 455/442 |
| 2002/0141375 A1 * | 10/2002 | Choi | ............................. | 370/347 |
| 2002/0193116 A1 * | 12/2002 | Agrawal et al. | ............... | 455/445 |
| 2003/0039228 A1 * | 2/2003 | Shiu et al. | ..................... | 370/331 |
| 2003/0073455 A1 * | 4/2003 | Hashem et al. | ............... | 455/525 |
| 2003/0190915 A1 * | 10/2003 | Rinne et al. | ................... | 455/436 |
| 2004/0152483 A1 * | 8/2004 | Furukawa | ..................... | 455/522 |
| 2004/0190378 A1 * | 9/2004 | Farmer | ......................... | 368/47 |
| 2004/0219926 A1 * | 11/2004 | Kim et al. | .................. | 455/452.2 |
| 2004/0252662 A1 * | 12/2004 | Cho | ............................. | 370/329 |
| 2005/0192011 A1 | 9/2005 | Hong et al. | | |
| 2005/0220040 A1 * | 10/2005 | Petrovic et al. | ............... | 370/278 |
| 2005/0250498 A1 | 11/2005 | Lim et al. | | |
| 2005/0282548 A1 | 12/2005 | Kim et al. | | |
| 2006/0094433 A1 | 5/2006 | Cheng et al. | | |
| 2006/0120490 A1 * | 6/2006 | Tiedemann et al. | .......... | 375/344 |
| 2006/0154671 A1 | 7/2006 | Kang et al. | | |
| 2006/0182063 A1 * | 8/2006 | Ma et al. | ....................... | 370/331 |

FOREIGN PATENT DOCUMENTS

EP 1076465 A1 2/2001

* cited by examiner

*Primary Examiner* — Huy Phan
*Assistant Examiner* — Julio Perez
(74) *Attorney, Agent, or Firm* — Perkins Coie LLP

(57) ABSTRACT

Efficient hand over mechanisms for OFDM and OFDMA wireless communication systems to operate a mobile subscriber station to transmit and receive a frame with only one base station while monitoring communications with adjacent base stations.

18 Claims, 3 Drawing Sheets

VIRTUAL SOFT HAND OVER IN OFDM AND OFDMA WIRELESS COMMUNICATION NETWORK

This application claims the benefit the U.S. Provisional Application No. 60/578,560 entitled "VIRTUAL SOFT HAND OVER PROCEDURE IN OFDM AND OFDMA WIRELESS COMMUNICATION NETWORKS" and filed Jun. 9, 2004, which is incorporated herein by reference in its entirety as part of the specification of this application.

BACKGROUND

This application relates to wireless communication systems and techniques based on orthogonal frequency division multiplexing (OFDM) and orthogonal frequency division multiple access (OFDMA).

Wireless communication systems use electromagnetic waves to communicate with wireless communication devices located within cells of coverage areas of the systems. A radio spectral range or band designated or allocated for a wireless communication service or a particular class of wireless services may be divided into different radio carrier frequencies for generating different communication frequency channels. This use of different frequencies for different communication channels may be used in various multiple access radio wireless communication systems.

OFDM and OFDMA systems generate different channels within a given band by using the orthogonal frequency division multiplexing to generate channel spectral profiles that are orthogonal to one another without interference when different channels are centered at selected equally-spaced frequencies. Under the OFDM, the frequency spacing can be smaller than the minimum spacing in conventional channels and hence increase the number of channels within a given band. The existing and developing specifications under IEEE 806.16x standards support wireless communications under OFDM and orthogonal frequency division multiple access (OFDMA). The drafts for IEEE 806.16e published in January 2004 (revision D3) and revised in May 2005 (revision D8) provide technical specifications for OFDM and OFDMA wireless systems.

One technical feature in OFDM and OFDMA systems is the hand-over process where a mobile subscriber station (MSS) changes from one base station (BS) to another adjacent base station due to various reasons. For example, the hand over may be initiated when the MSS moves in its location due to signal fading, interference levels, etc. at the current serving base station and thus needs to change another base station to which the MSS is connected in order to provide a higher signal quality. In another example, a hand over may be initiated when the MSS can be serviced with higher QoS at another base station.

Such a hand over process may be implemented in different ways. For example, a soft hand over (SHO) process is to operate the MSS to simultaneously communicate with and to receive and send communication traffic with two or more adjacently located base stations and to synchronize the data among the different communication traffic with the different base stations to ensure continuing service during the hand over process.

SUMMARY

This application describes a virtual soft hand over (VSHO) to ensure the hand over quality with reduced complexity and overhead in the hand over process. The present VSHO technique uses diversity gain at reduced complexity comparing to the standard HO procedure within an IEEE 802.16e system. In implementations, the present VSHO utilizes a selection diversity and a fast switching mechanism to improve the link quality with less complexity. Instead of transmission synchronization by multiple BSs required by the SHO process, the present VSHO process uses a fast switching mechanism to allow data transmission from the BS with the best channel condition at any given time. A common shared MAC process is employed to facilitate the hand over process. As an example, this common shared MAC process can be achieved by a full MAC context sharing or transfer among BSs.

The present VSHO can be implemented to provide a number of technical features. As an example, it can provide diversity gain by allowing fast switching of data transmission from one BS to another BS dynamically. In the present VSHO, only one BS is transmitting at any given time, the scheduler can be more flexible and optimized than in the SHO implementation since no data synchronization is needed. In addition, the present VSHO can be configured to support data connection with the hybrid automatic Repeat request (H-ARQ) mechanism to further improve the link quality. Furthermore, the implementations of the present VSHO can be efficient and thus do not require additional air link capacity or resource.

In one implementation, a method for implementing a hand over of a mobile subscriber station (MSS) in a wireless communication network includes operating the MSS to monitor air interface messages from a plurality of adjacent base stations; controlling the MSS to transmit data to and receive data from only a single one of the adjacent base stations in each single frame; and processing the messages from the plurality of adjacent base stations to decide which base station is to be used for a frame.

Exemplary implementations and various features of the present VSHO are now described in greater detail in the attached drawings, the detailed description, and the claims.

DETAILED DESCRIPTION

Figure 1:
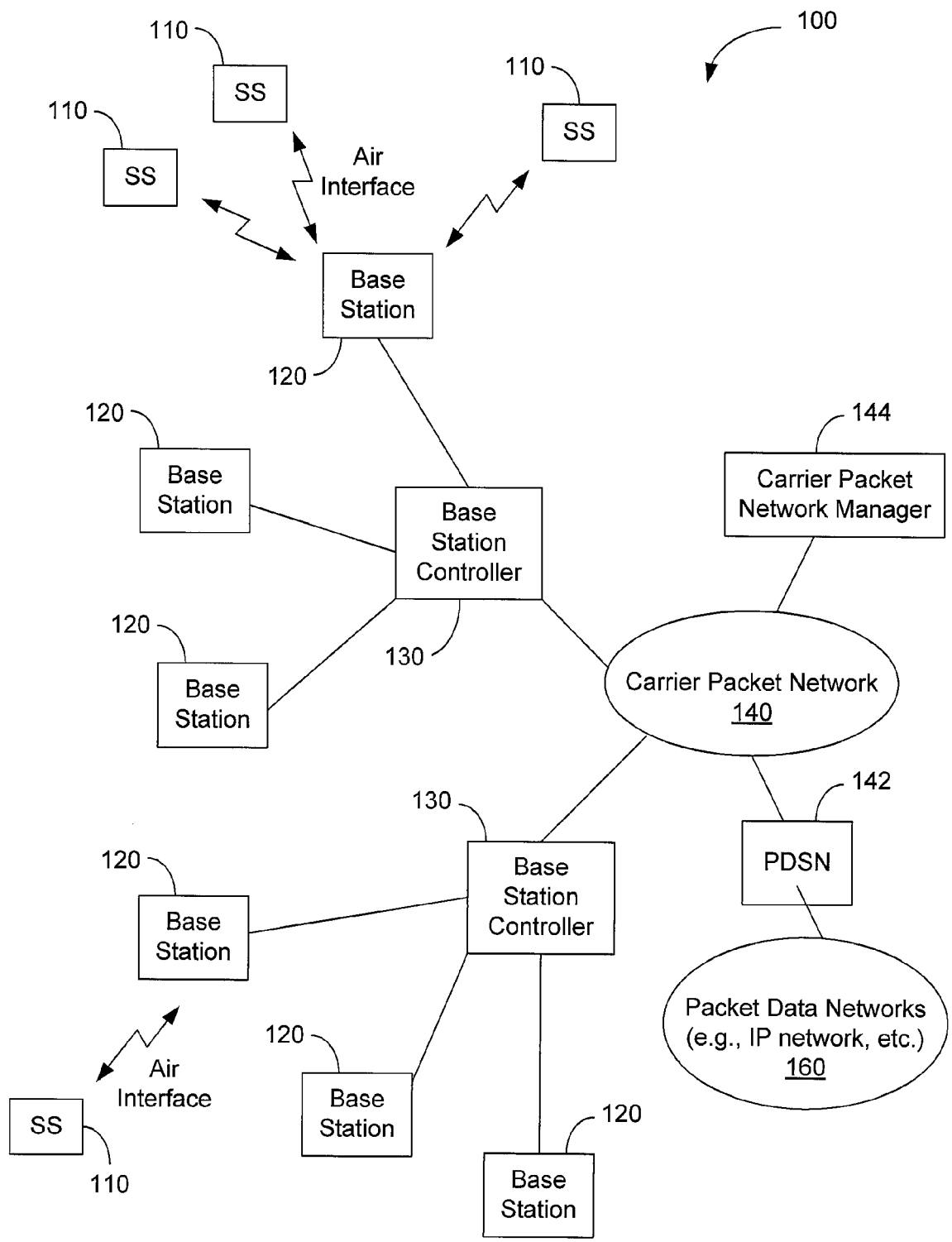
FIG. 1 shows an example of an OFDM/OFDMA wireless communication system in which the present VSHO can be implemented.

FIG. 1 illustrates an exemplary wireless communication system 100 that uses communication channels at different frequencies to provide wireless communication services based on OFDM and OFDMA and can be used to implement the present VSHO process. The system 100 may include a network of base stations (BSs) or base station transceivers 120 that are spatially distributed in a service area to form a radio access network for wireless subscriber stations (SSs) 110. A SS may be a MSS or a fixed SS which may be relocated within the system. In some implementations, a base station 120 may be designed to have directional antennas and to produce two or more directional beams to further divide each cell into different sections. Base station controllers (BSCs) 130 are connected, usually with wires or cables, to BSs 120 and control the connected BSs 120. Each BSC 130 is usually connected to and controls two or more designated BSs 120.

The wireless system 100 may include a carrier packet network 140 that may be connected packet data network 160 (e.g., an IP network). A packet data serving node 142 may be used to provide an interface between the carrier packet network 140 and the packet data network 160. In addition, a carrier packet network manager 144 may be connected to the carrier packet network 140 to provide various network management functions, such as such as an AAA server for authentication, authorization, and accounting (AAA) functions.

Each subscriber station 110 may be a stationary or mobile wireless communication device. Examples of a stationary wireless device may include desktop computers and computer servers. Examples of a mobile wireless device (i.e., a MSS) may include mobile wireless phones, Personal Digital Assistants (PDAs), and mobile computers. A subscriber station 110 may be any communication device capable of wirelessly communicating with base stations 120. In the examples described here, mobile wireless devices or mobile stations (MSs) are used as exemplary implementations of the subscribed stations.

Figure 2:
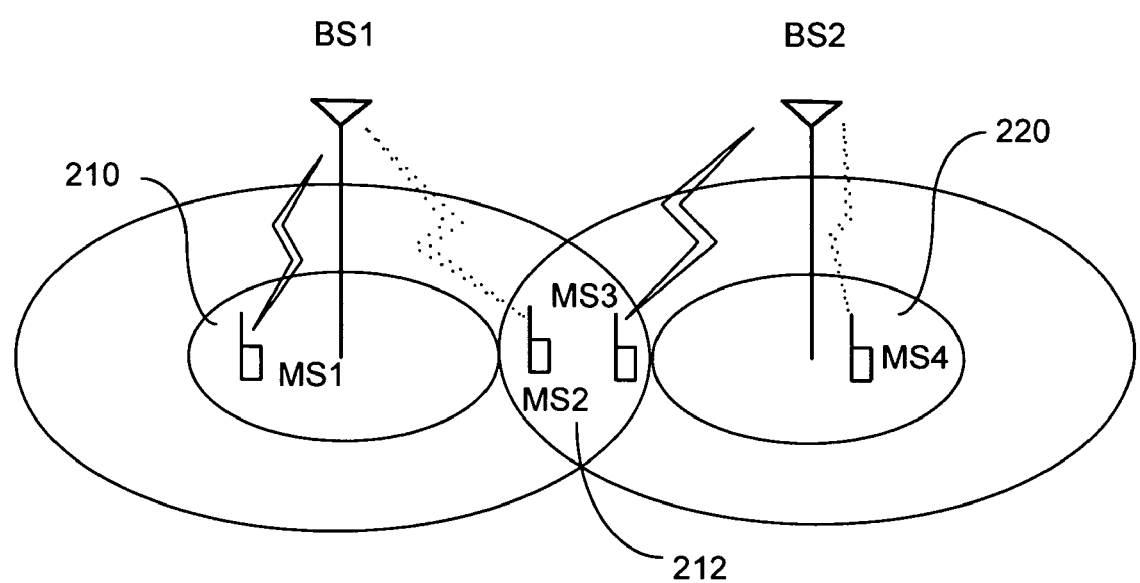
FIG. 2 shows hand over zones between two base stations in the system shown in FIG. 1.

FIG. 2 illustrates one exemplary implementation of a hand over process. Two neighboring base stations BS1 and BS2 in the system 100 divide their respective radio cells into two zones, a hand-over zone and a non-hand-over zone based on the radial distance from the respective base station. In the hand-over zone, a subscriber station receives signals from both base stations BS1 and BS2 and may be operated to select either of the two base stations BS1 and BS2 to communicate. Notably, a subscriber station may switch from BS1 to BS2 in the hand-over zone or vice versa. In the non-hand-over zone of the cell, a subscriber station receives signals only from its own base station but not from the other neighboring station. To be more accurately, the signals from the base station in the neighboring cell are below the threshold power level for a normal communication link.

As a specific example, FIG. 2 shows that the cell of the base station BS1 has a central region 210 around the BS1 as the non-hand-over zone in which a signal from the neighboring BS2 is not sufficiently strong to allow for a subscriber station in the region 210 to communicate with the BS2. Similarly, the cell of the neighboring base station BS2 has a central zone 220 as the non-hand-over zone in which a subscriber station only communicates with the BS2. A region 212 between the BS1 and BS2 outside the non-hand-over zones 210 and 220 is shown as the hand-over zone for at least the base stations BS1 and BS2 and may also receive signals from other neighboring base stations. Similar hand-over zones exist for BS1 with other neighboring base stations and are not illustrated here. The present VSHO process generally happens in the hand-over zones. Although only two base stations are shown in FIG. 2, it is understood that three or more adjacent base stations may be within the radio range with the MSS and may be part of the present VSHO process.

Several technical concepts are now introduced for the VSHO. Some aspects of these concepts may be described in IEEE 802.16e/D8 (May 2005) in connection with the fast base station switching (FBSS) mechanism. See, generally, the description in Section 6.3.21 entitled "MAC layer handover procedure" and more specifically see sections 6.3.21.3, 6.3.21.3.2, 6.3.21.3.3 4. section 6.3.21.3.4, 6.3.21.3.4.1, and 6.3.21.3.4.2. The entire description in Section 6.3.21 entitled "MAC layer handover procedure" of IEEE 802.16e/D8 (May 2005) is incorporated herein by reference as part of the specification of this application.

First, a serving BS is a BS that has allocated resources to the MSS, i.e. assigned Basic connection identifier (CID), Primary Management CID, Secondary Management CID and data CIDs to the MSS which is kept in synchronization with a serving BS at all times. A target BS is a BS that the MSS is intended to hand over to. Once the hand over process is successfully completed, a target BS becomes a serving BS. A transmitting BS is the serving BS that is designated to transmit data to and receive data from the MSS at a given frame. An active set is a data sheet with a list of serving BSs to the MSS and is maintained at the BS.

Figure 3:
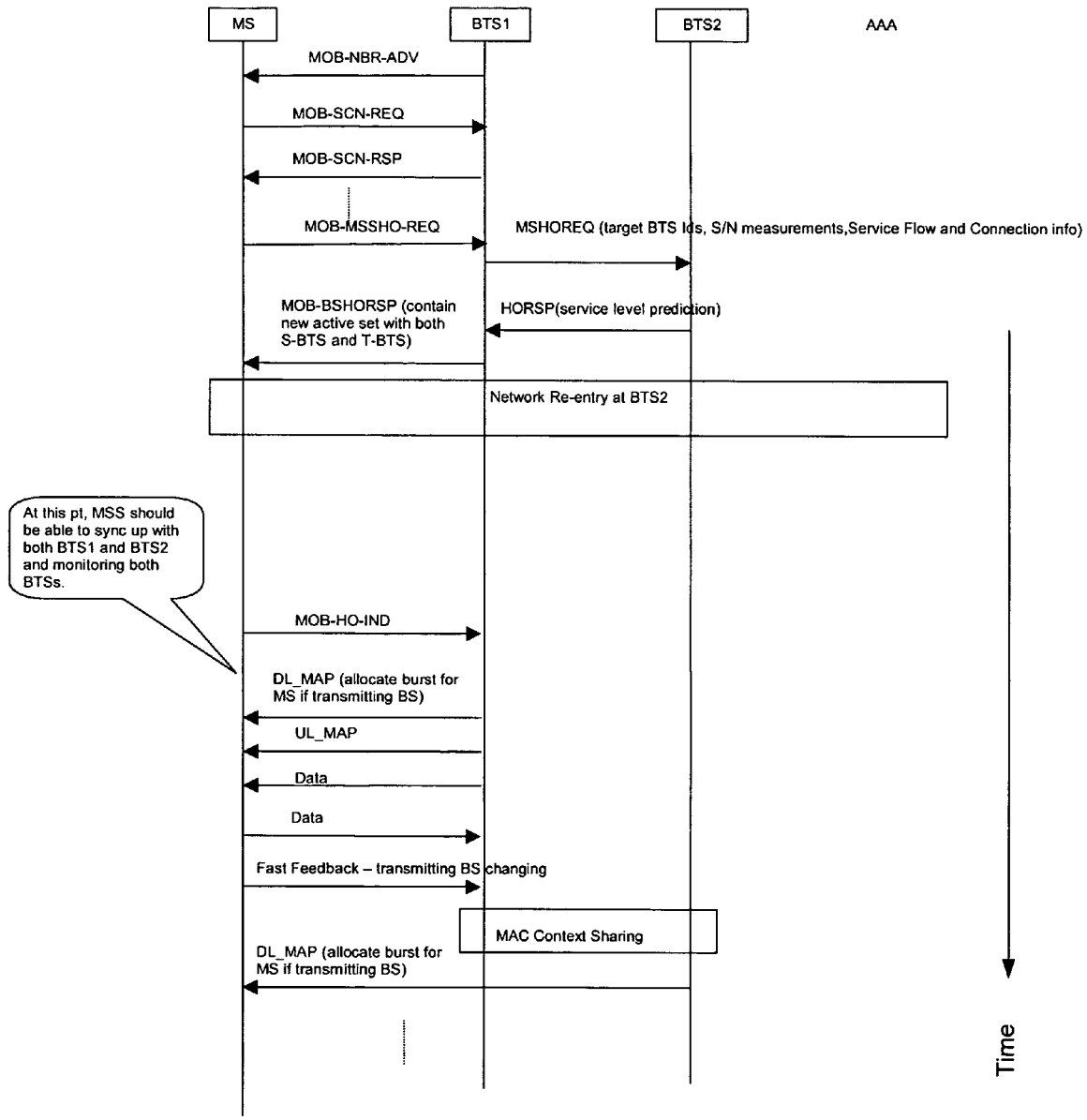
FIG. 3 shows an example of the air interface message flow in one implementation of the present virtual soft hand over process.

FIG. 3 illustrates the message flow of one implementation of the present VSHO. When a MSS is in a VSHO process, the MSS's active set contains multiple serving BSs. The MSS is only transmitting/receiving data to/from one of the serving BSs (transmitting BS) at any given frame. The transmitting BS can change from frame to frame depending on the BS allocation scheme. Therefore, different transmitting BSs may be used in transmitting different frames. Although the MSS only receiving and transmitting the traffic with one BS in each frame, the MSS is simultaneously monitoring other BSs during the VSHO process. For example, the MSS is controlled to process the DL_MAP message which is a directory of the slot locations within the downlink subframe, and UL_MAP which is a directory of slot locations within the uplink subframe from all serving BSs at each frame. Based on the DL MAP and UL MAP messages from other serving BSs, the MSS decides which serving BS is the transmitting BS for the current frame. Alternatively, the switching of transmitting BS can also be done through the MAC message and the MSS does not need to read DL_MAP and UL_MAP from multiple BSs.

The MSS monitors the downlink of all serving BSs in the active set and determines its preferred transmitting BS based on received Carrier-to-Interference-plus-Noise-Ratio (CINR) from all serving BS. The MSS sends its preferred transmitting BS to the current transmitting BS over fast feedback channel. When the BS receives the request, the receiving BS changes the transmitting BS to the MSS preferred BS after all H-ARQ (if activated) re-transmissions are completed.

In FIG. 3, a specific example for adding a serving BS is illustrated to show the basic operation of the present VSHO.

Some features of the air interface messages used in FIG. 3 are as follows. A BS broadcasts information about the network topology using the MOB-NBR-ADV MAC Management message. When an MSS performs the scanning of neighbor BSs, it may use the channel information about neighbor BSs acquired from this message. After scanning for neighbor BSs using the scanning interval allocated by the serving BS, the MSS shall report the scanning result to the Serving BS through MOB-SCAN-REPORT message, periodically or in case of a specific event which can be that the rank of the received CINR of neighbor BSs is changed. This scanning report may assist Serving BS to recommend suitable BSs for BS initiated handover operation. The Scanning Interval Allocation Request (MOB-SCN-REQ) message may be transmitted by an MSS to request a scanning interval for the purpose of seeking neighbor BS, and determining their suitability as targets for the hand over. The Scanning Interval Allocation Response (MOB-SCN-RSP) message is transmitted by the BS in response to an MOB-SCN-REQ message sent by an MSS. In addition, BS may send an unsolicited MOB_SCN_RSP. The message is to be transmitted on the basic CID. As an example, the MOB-SCN-REQ message can be sent by the BS with setting parameters to all zeros when it wants to deny scan request from the MSS and the BS includes all parameters (e.g., Scan Duration, Start Frame, Interleaving interval, etc.) in the MOB-SCN-RSP message. The MSS may transmit an MSS HO Request (MOB-MSSHO-REQ) message (MOB-MSSHO-REQ message) when the MSS initiates a hand over. The MOB-MSSHO-REQ message is transmitted on the basic CID. In addition, when an MSS starts actual handover process, it sends an MOB_HO-IND with HO_IND_type="00". When a serving BS receives an MOB-HO-IND message, the serving BS may release resource or retain it in order to transfer to a target BS when it is requested in future operations.

In implementing the present VSHO, the MS and the BS maintain a list of BSs that are involved in VSHO with the MS. The list is called the Active Set. Among the BSs in the Active Set, an Anchor BS is defined. Regular operation when MS is registered at a single BS is a particular case of VSHO with Active Set consisting of single BS, which in this case shall be the Anchor BS. When operating in VSHO, the MS only communicates with the Anchor BS for UL and DL messages including management and traffic connections. Transition from one Anchor BS to another ("switching") is performed. The BS broadcasts the DCD message that includes the H_Add Threshold and H_Delete Threshold. These thresholds may be used by the MS to determine if MOB_MSHO-REQ should be sent to request switching to another Anchor BS or changing Active Set. When the mean CINR of a BS is less than a threshold (H_Delete Threshold), the MS may send MOB_MSHO-REQ to request dropping this BS from the active set; when the mean CINR of a neighbor BS is higher than H_Add Threshold, the MS may send MOB_MSHO-REQ to request adding this neighbor BS to the active set. In each case Anchor BS responds with MOB_BSHO-RSP with updated Active Set.

The process of updating Active Set begins with MOB_MSHO-REQ from MS or MOB_BSHO-REQ from the Anchor BS. Process of Anchor BS update may also begin with MOB_MSHO-REQ from MS or MOB_BSHO-REQ from the Anchor BS or it may begin with Anchor switching indication via Fast Feedback channel. If an MS that transmitted a MOB_MSHO-REQ message detects an incoming MOB_BSHO-REQ message, it may respond with a MOB_MSHO-REQ or MOB_HO-IND message and ignore its own previous request. Similarly, a BS that transmitted a MOB_BSHO-REQ message and detects an incoming MOB_MSHO-REQ or MOB_HO-IND message from the same MS can ignore its own previous request.

In some implementations, there are several conditions for implementing the VSHO handover between MS and a group of BSs. These conditions include (1) BSs involving in VSHO are synchronized based on a common time source; (2) The frames sent by the BSs from Active Set arrive at the MS within the prefix interval; (3) BSs involving in VSHO have synchronized frames; (4) BSs involving in VSHO operate at same frequency channel; and (5) BSs involving in VSHO are also required to share or transfer MAC context. Such MAC context includes all information MS and BS normally exchange during Network Entry, particularly authentication state, so that an MS authenticated/registered with one of BSs from active set BSs is automatically authenticated/registered with other BSs from the same active set. The context includes also set of Service Flows and corresponding mapping to connections associated with MS, current authentication and encryption keys associated with the connections.

In implementing the present VSHO, the related MAC management messages are processed as follows. The MS reports the preferred Anchor BS by using the MOB_MSHO-REQ message. The BS informs the MS of the Anchor BS update through MOB_BSHO-REQ or MOB_BSHO-RSP message with the estimated switching time. The MS updates its Anchor BS based on the information received in MOB_BSHO-REQ or MOB_BSHO-RSP. The MS also indicates its acceptance of the new anchor BS through MOB_HO-IND, with SHOFBSS_IND_type field set to 0b00. The MS may reject the Anchor BS update instruction by the BS, by setting the SHOFBSS_IND_type field in MOB_HO-IND to 0b10 (Anchor BS update reject). The BS may reconfigure the Anchor BS list and retransmit MOB_BSHO-RSP or MOB_BSHO-REQ message to the MS. After an MS or BS has initiated an Anchor BS update using MOB_MSHO/BSHO-REQ, the MS may cancel Anchor BS update at any time. The cancellation shall be made through transmission of a MOB_HO-IND with SHOFBSS_IND_type field set to 0b01.

The present VSHO includes a feedback from a BS to the MSS during the VSHO, now referred as Fast Anchor BS Selection Feedback Mechanism. For MS and BS using the Fast-feedback method to update Active BS Set, when the MS has more than one BS in its active set, the MS transmits fast Anchor BS selection information to the current Anchor BS using Fast-feedback channel. If the MS needs to transmit Anchor BS selection information, it transmits the codeword corresponding to the selected Anchor BS via its Fast-feedback channel. The codeword is identified by TEMP_BSID assigned to the BSs in an active set.

Only a few implementations and examples are described, however other variations, modification and enhancements are possible.

What is claimed is:

1. A method for implementing a hand over of a mobile subscriber station (MSS) in a wireless communication network, comprising:

operating the MSS that is serviced by a current base station of a plurality of adjacent base stations to monitor air interface messages from the plurality of adjacent base stations;

controlling the MSS to transmit data to and receive data from only the current base station in one or more bursts that are allocated for the MSS in each single frame while simultaneously operating the MSS to monitor air interface messages from the plurality of adjacent base stations including the current base station, wherein the data comprises communication traffic between the MSS and the current base station, wherein the current base station is the only base station of the plurality of adjacent base stations operated to transmit data to the MSS using the one or more bursts that are allocated for the MSS in the each single frame;

operating the MSS to identify a preferred base station of the plurality of adjacent base stations to replace the current base station based on the monitored air interface messages;

receiving a request from the MSS to hand over the MSS from the current base station to the preferred base station for the MSS to transmit data to and receive data from the preferred base station subsequent to the handing over; and in response to receiving the request, changing the base station that services the MSS from the current base station to the preferred base station, wherein the MSS is operated to select the preferred base station based on carrier to interference plus noise ratio (CINR) values received from the plurality of adjacent base stations, and wherein changing the base station that services the MSS from the current base station to the preferred base station further comprises:

transmitting a signal to the current base station identifying the preferred base station;

stopping the MSS from transmitting data to and receiving data from the current base station; and operating the MSS to exchange transmission of data at a subsequent frame with the preferred base station.

2. The method of claim 1, the messages include DL_MAP and UL_MAP messages.

3. The method of claim 1, wherein the signal is transmitted to the current base station by a fast feedback channel.

4. The method of claim 1, wherein the wireless communication network is an orthogonal frequency division multiplexing (OFDM) wireless communication network.

5. The method of claim 1, wherein the wireless communication network is an orthogonal frequency division multiple access (OFDMA) wireless communication network.

6. The method of claim 1, further comprising maintaining, at the current base station, an active set comprising a list of the plurality of adjacent base stations.

7. The method of claim 1, wherein the current base station and the preferred base station operate at a same frequency channel.

8. The method of claim 1, wherein the current base station and the preferred base station have synchronized frames.

9. The method of claim 1, wherein the current base station and the preferred base station share MAC context.

10. A method for implementing a hand over of a mobile subscriber station (MSS) in a wireless communication network, comprising:

maintaining an active set comprising a list of transmitting base stations, each transmitting base station capable of communicating with the MSS, the MSS communicating with only one current transmitting base station in a single frame;

monitoring all transmitting base stations in the active set while transmitting data to and receiving data from the current transmitting base station in one or more bursts that are allocated for the MSS in the single frame, the data representing communication traffic between the MSS and the current transmitting base station, wherein the current transmitting base station is the only base station of the list of transmitting base stations operated to transmit data to the MSS using the one or more bursts that are allocated for the MSS in the single frame;

determining a preferred transmitting base station included in the transmitting base stations based upon the monitoring;

informing the preferred transmitting base station to the current transmitting base station by a fast feedback channel;

stopping the MSS from transmitting data to and receiving data from the current transmitting base station; and operating the MSS to exchange transmission of data at a subsequent frame with the preferred base station.

11. The method of claim 10, wherein the active set is maintained in the MSS and the current transmitting base station.

12. The method of claim 10, wherein determining the preferred transmitting base station is based on received carrier to interference plus noise ratio (CINR) values from the transmitting base stations included in the list.

13. The method of claim 10, further comprising completing any activated hybrid automatic repeat requests (H-ARQ) prior to switching from the current transmitting base station to the preferred transmitting base station.

14. The method of claim 10, wherein the wireless communication network is an orthogonal frequency division multiplexing (OFDM) wireless communication network.

15. The method of claim 10, wherein the wireless communication network is an orthogonal frequency division multiple access (OFDMA) wireless communication network.

16. The method of claim 10, wherein the current transmitting base station and the preferred transmitting base station operate at a same frequency channel.

17. The method of claim 10, wherein the current transmitting base station and the preferred transmitting base station have synchronized frames.

18. The method of claim 10, wherein the current transmitting base station and the preferred transmitting base station share MAC context.

* * * * *

UNITED STATES PATENT AND TRADEMARK OFFICE
CERTIFICATE OF CORRECTION

| | | |
|---|---|---|
| PATENT NO. | : 7,953,411 B1 | Page 1 of 1 |
| APPLICATION NO. | : 11/150829 | |
| DATED | : May 31, 2011 | |
| INVENTOR(S) | : Mary Chion | |

It is certified that error appears in the above-identified patent and that said Letters Patent is hereby corrected as shown below:

IN THE DRAWINGS

In Fig. 3, Sheet 3 of 3, Line 5, please delete "MSHOREQ" and insert -- MSHO-REQ --, therefor.

In Fig. 3, Sheet 3 of 3, Line 6, please delete "MOB-BSHORSP" and insert -- MOB_BSHO-RSP --, therefor.

Signed and Sealed this
Thirteenth Day of March, 2012

David J. Kappos
*Director of the United States Patent and Trademark Office*